(12) United States Patent
Lee et al.

(10) Patent No.: US 10,410,371 B2
(45) Date of Patent: Sep. 10, 2019

(54) CLUTTERED BACKGROUND REMOVAL FROM IMAGERY FOR OBJECT DETECTION

(71) Applicant: THE BOEING COMPANY, Chicago, IL (US)

(72) Inventors: David K. Lee, Garden Grove, CA (US); David L. Caballero, Huntington Beach, CA (US); Thomas P. Weismuller, Orange, CA (US)

(73) Assignee: THE BOEING COMPANY, Chicago, IL (US)

( * ) Notice: Subject to any disclaimer, the term of this patent is extended or adjusted under 35 U.S.C. 154(b) by 44 days.

(21) Appl. No.: 15/850,219

(22) Filed: Dec. 21, 2017

(65) Prior Publication Data
US 2019/0197724 A1 Jun. 27, 2019

(51) Int. Cl.
*G06T 7/73* (2017.01)
*G06T 7/246* (2017.01)
(Continued)

(52) U.S. Cl.
CPC .............. *G06T 7/73* (2017.01); *G01C 21/36* (2013.01); *G06K 9/2054* (2013.01);
(Continued)

(58) Field of Classification Search
CPC .......... G06T 7/73; G06T 7/136; G06T 7/194; G06T 7/246; G06T 2207/30252;
(Continued)

(56) References Cited

U.S. PATENT DOCUMENTS

| 4,575,805 A | 3/1986 | Moermann et al. |
| 4,671,650 A * | 6/1987 | Hirzel ............... G01P 3/806 324/160 |

(Continued)

FOREIGN PATENT DOCUMENTS

WO 0243352 A2 5/2002

OTHER PUBLICATIONS

Berthold K.P. Horn, "Determining Constant Optical Flow," 2003, 11 pages.
(Continued)

*Primary Examiner* — Jonathan S Lee
(74) *Attorney, Agent, or Firm* — Patterson + Sheridan, LLP

(57) ABSTRACT

Embodiments herein describe tracking the location and orientation of a target in a digital image. In an embodiment, this tracking can be used to control navigation for a vehicle. In an embodiment, a digital image can be captured by a visual sensor is received. A first array including a plurality of binary values related to the pixel velocity of a first plurality of pixels in the digital image as compared to corresponding pixels in a first one or more prior digital images can be generated. A second array including a plurality of values related to the standard deviation of pixel intensity of the first plurality of pixels in the digital image as compared to corresponding pixels in a second one or more prior digital images can be further generated. A plurality of thresholds relating to the values in the second array can be determined. A plurality of target pixels and a plurality of background pixels can be identified in the digital image, based on the first array, the second array, and the plurality of thresholds. A binary image related to the digital image, based on the identified plurality of target pixels and the identified plurality of background pixels, and identifying at (Continued)

least one of a location and an orientation of the target in the digital image based on the binary image, can be generated. In an embodiment, a command can be transmitted to a navigation system for a vehicle, to assist in navigating the vehicle toward the target, based on the identified at least one of a location and an orientation of the target.

20 Claims, 11 Drawing Sheets

(51) Int. Cl.
| | |
|---|---|
| *G06K 9/38* | (2006.01) |
| *G06K 9/20* | (2006.01) |
| *G06T 7/194* | (2017.01) |
| *G06T 7/136* | (2017.01) |
| *G01C 21/36* | (2006.01) |
| *G06K 9/32* | (2006.01) |

(52) U.S. Cl.
CPC .......... *G06K 9/3233* (2013.01); *G06K 9/38* (2013.01); *G06T 7/136* (2017.01); *G06T 7/194* (2017.01); *G06T 7/246* (2017.01); *G06T 2207/30252* (2013.01)

(58) Field of Classification Search
CPC .... G01C 21/36; G06K 9/2054; G06K 9/3233; G06K 9/38
USPC .......................................................... 382/103
See application file for complete search history.

(56) References Cited

U.S. PATENT DOCUMENTS

| | | | |
|---|---|---|---|
| 5,127,037 A | 6/1992 | Bynum | |
| 5,377,011 A | 12/1994 | Koch | |
| 5,748,775 A | 5/1998 | Tsuchikawa et al. | |
| 5,960,097 A * | 9/1999 | Pfeiffer | G06K 9/3241 342/357.59 |
| 6,052,485 A | 4/2000 | Nelson et al. | |
| 6,112,109 A | 8/2000 | D'Urso | |
| 6,603,880 B2 | 8/2003 | Sakamoto | |
| 6,954,551 B2 | 10/2005 | Weismuller | |
| 7,346,224 B2 | 3/2008 | Kong et al. | |
| 7,860,344 B1 * | 12/2010 | Fitzpatrick | G06K 9/3241 345/419 |
| 8,542,872 B2 * | 9/2013 | Gornick | G06K 9/00771 382/103 |
| 2002/0030739 A1 | 3/2002 | Nagaya et al. | |
| 2005/0025354 A1 | 2/2005 | Macy et al. | |
| 2005/0157919 A1 | 7/2005 | Di Santo et al. | |
| 2006/0147090 A1 | 7/2006 | Yang | |
| 2006/0244866 A1 | 11/2006 | Kishida | |
| 2008/0310677 A1 | 12/2008 | Weismuller et al. | |

OTHER PUBLICATIONS

Mark Vriesenga and Jack Sklansky, "Motion-Based Target Recognition," Feb. 1, 1994, 44 pages.
Berthold K.P. Horn and Brian G. Schunck, "Determine Optical Flow," Artificial Intelligence Laboratory, Massachusetts Institute of Technology, 1981, 19 pages.
S.S. Beauchemin and J.L.Barron,k "The Computation of Optical Flow," Department of Computer Science, University of Western Ontario, ACM Computing Surveys, vol. 27, No. 3. pp. 433-467, 1995.
Isasi Forum. Isasi Code of Ethics Canons (Air Safety Through Investigation), Jan.-Mar. 2004, pp. 1-32.
Cheng-Hua, Pai et al. "Moving Object Detection on a Runway Prior to Landing Using an Onboard Infrared Camera," Computer Vision and Pattern Recognition, 2007, CVPR '07, IEEE Conference on, IEEE, Piscataway, NJ, pp. 1-8, Jun. 1, 2007, XP-031114677.
Jordan, M.P. et al., "Detection and Tracking of Targets Against a Cloudscene Background Using Space-Based Sensors<12>" Aerospace Conference Proceedings, 2000 IEEE, Piscataway, NJ, oos. 365-371, Mar. 18-25, 2000, XP-010518707.

* cited by examiner

CLUTTERED BACKGROUND REMOVAL FROM IMAGERY FOR OBJECT DETECTION

FIELD OF THE DISCLOSURE

Aspects described herein relate to object detection in an image, and more specifically to tracking of a target in a digital image that includes a cluttered background.

DESCRIPTION OF THE RELATED ART

Tracking of objects using visual imagery is important to a wide variety of applications, including surveillance, vehicle docking, and many others. The objects tracked can include ground vehicles, aircraft, satellites, humans, or virtually anything else that moves across the field of view. Visual input for tracking can be provided from visual sensors, infrared cameras, or any other imaging devices capable of providing visual input. As part of the tracking process, a system must be able to distinguish the object of interest from the background in the imagery. Existing image processing methods for distinguishing an object of interest from a background, however, are generally not effective when presented with a wide variation in pixel intensity within the background and within the target.

SUMMARY

One embodiment described herein is a method for controlling navigation of a vehicle by tracking the location and orientation of a target in a digital image. The method includes receiving a digital image captured by a visual sensor, generating a first array including a plurality of binary values related to the pixel velocity of a first plurality of pixels in the digital image as compared to corresponding pixels in a first one or more prior digital images and generating a second array including a plurality of values related to the standard deviation of pixel intensity of the first plurality of pixels in the digital image as compared to corresponding pixels in a second one or more prior digital images. The method further includes determining a plurality of thresholds relating to the values in the second array, identifying a plurality of target pixels and a plurality of background pixels in the digital image, based on the first array, the second array, and the plurality of thresholds, generating a binary image related to the digital image, based on the identified plurality of target pixels and the identified plurality of background pixels, and identifying at least one of a location and an orientation of the target in the digital image based on the binary image. The method further includes transmitting a command to a navigation system for the vehicle, to assist in navigating the vehicle toward the target, based on the identified at least one of a location and an orientation of the target.

Another embodiment described herein is a method for tracking the location and orientation of a target in a digital image. The method includes receiving a digital image captured by a visual sensor, generating a first array including a plurality of binary values related to the pixel velocity of a first plurality of pixels in the digital image, and generating a second array including a plurality of values related to the standard deviation of pixel intensity of the first plurality of pixels in the digital image. The method further includes identifying a plurality of target pixels and a plurality of background pixels in the digital image, based on the first array and the second array, and identifying at least one of a location and an orientation of the target in the digital image based on the identified plurality of target pixels and a plurality of background pixels.

Another embodiment described herein is a system, including a processor and a memory storing a program, which, when executed on the processor, performs an operation. The operation includes receiving a digital image captured by a visual sensor, generating a first array including a plurality of binary values related to the pixel velocity of a first plurality of pixels in the digital image, generating a second array including a plurality of values related to the standard deviation of pixel intensity of the first plurality of pixels in the digital image, identifying a plurality of target pixels and a plurality of background pixels in the digital image, based on the first array and the second array, and identifying at least one of a location and an orientation of the target in the digital image based on the identified plurality of target pixels and a plurality of background pixels

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings.

DETAILED DESCRIPTION

Figure 1:
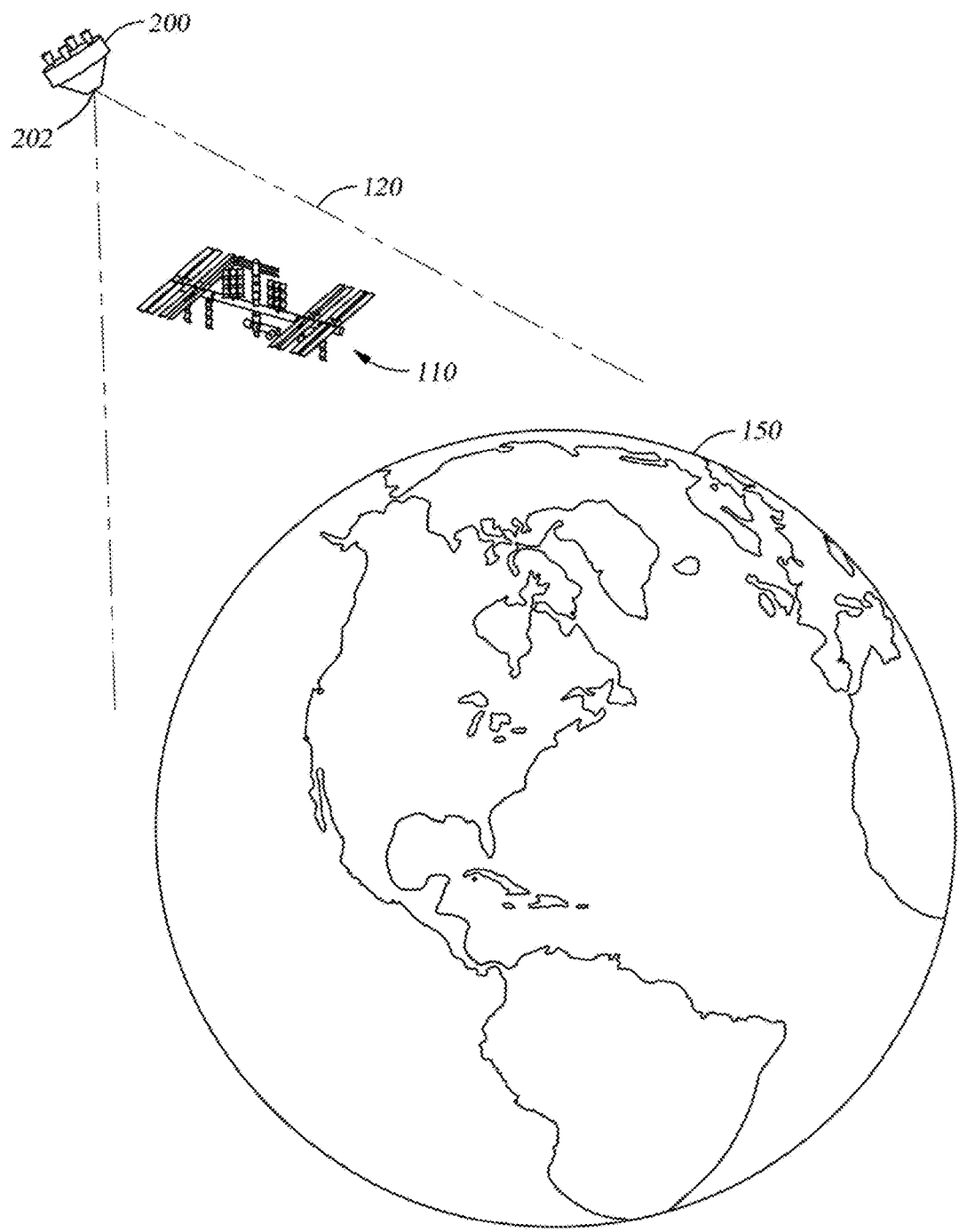
FIG. 1 is a an example illustration of a vehicle detecting a target against a background in an image, according to one embodiment described herein.

Embodiments disclosed herein relate to improved methods, systems, and apparatus for distinguishing an object of interest from background imagery. One way to distinguish an object of interest from the background in a digital image is to compute a pixel threshold value that can be used to separate the target and background pixels. In some cases, this is an relatively straightforward task, such as when tracking a brightly lit airplane across a dark night sky. In this scenario, it is relatively easy to determine a pixel intensity threshold to use in distinguishing background pixels from target pixels. Once the threshold has been determined, pixels with a value below the threshold are almost certainly background (e.g., dark night sky), and pixels with a value above the threshold are almost certainly the target being tracked. The problem is similarly straightforward, but reversed, if the target (e.g., an aircraft) is very dark, but the background is a bright day sky. In this case, the threshold divides dark pixels belonging to the target from bright pixels belonging to the sky.

In many real-world applications, however, the scene being processed may have wide variation in pixel intensity within the background and within the target, often overlapping. In these circumstances a simple instantaneous pixel intensity threshold would not be sufficient to remove the background and extract the desired target(s). This solution is further vulnerable to cluttered scenes because it depends on analysis of pixel intensities in a given frame. If there is no distinguishable difference in intensity, then clutter can contaminate the detection process and fail to extract the desired target.

The disclosure herein relates to embodiments for extracting highly complex targets in moving, dynamic scenes where both the target and background fluctuate widely in instantaneous pixel intensity. Unlike other methods (where the background is static and the target is moving), these embodiments are capable of working on scenes where the target and background are both moving relative to the sensor. This removes many of the constraints imposed by the fixed background techniques and provides users with many more potential use cases. Furthermore, in some scenarios the described embodiments can use a secondary threshold/discriminator based on velocity gradients, allowing more effective discrimination between background and target pixels under a wide range of clutter conditions, since these gradients can be predicted by the specific geometry of the background noise source.

For example, embodiments disclosed herein can be used as part of a navigation system for a vehicle, like a spacecraft. The vehicle's navigation system could use visual tracking to assist in docking with an object in space, like a satellite or space station. But this requires identifying both the location and orientation of a target in a potentially cluttered image including, for example, an image of the earth in the background. Further, in this scenario, the earth's spherical shape complicates location of the target within the image, because the background image will move in complex ways across the field of view of the vehicle. Embodiments described herein can improve on object detection in this scenario because they are less sensitive to movement between frames and are capable of handling large pixel movement between frames (for example, tens of pixels of target movement per frame). The vehicle's navigation system can then use the detected information about the location and orientation of the target to, for example, assist in navigating to, and docking with, the target.

FIG. 1 is an example of one scenario in which it is useful to track a target against a cluttered background. A vehicle 200 navigates based, at least in part, on tracking a target 110 through a visual sensor 202. For example, the vehicle 200 could be a spacecraft and the target 110 could be a satellite or space station. The vehicle 200 has a visual sensor 202 with a field of view 120. The visual sensor 202 could be, for example, a camera or any other suitable visual sensor. The vehicle 200 can track the location and orientation of the target 110 using the visual sensor 202 to facilitate docking with the target 110. But the visual sensor 202 may also pick up a background image 150—here, an image of the earth. To track the target 110 using the visual sensor 202, the vehicle 200 must be able to separate pixels representing the target 110 from pixels representing the background image 150. This allows the vehicle 200 to determine the location and orientation of the target 110—the vehicle 200 can use this location and orientation to navigate to the target 110 and dock with the target 110.

While FIG. 1 illustrates a spacecraft as an example vehicle according to the disclosure herein, the embodiments herein are not limited to navigation for vehicles in space. The disclosed embodiments could be useful in a wide variety of scenarios in which it is desirable to track an object against a cluttered background. For example, the disclosed embodiments could be used in homeland security or battlefield target tracking and interception, in military and commercial satellite imaging and tracking, in lunar and planetary exploration, in commercial and aviation imaging for manned and unmanned aerial vehicles, in military and commercial underwater exploration including mine detection and oil exploration, in sensor surveillance, in assembly line inspection, or in any other suitable application.

Figure 2:
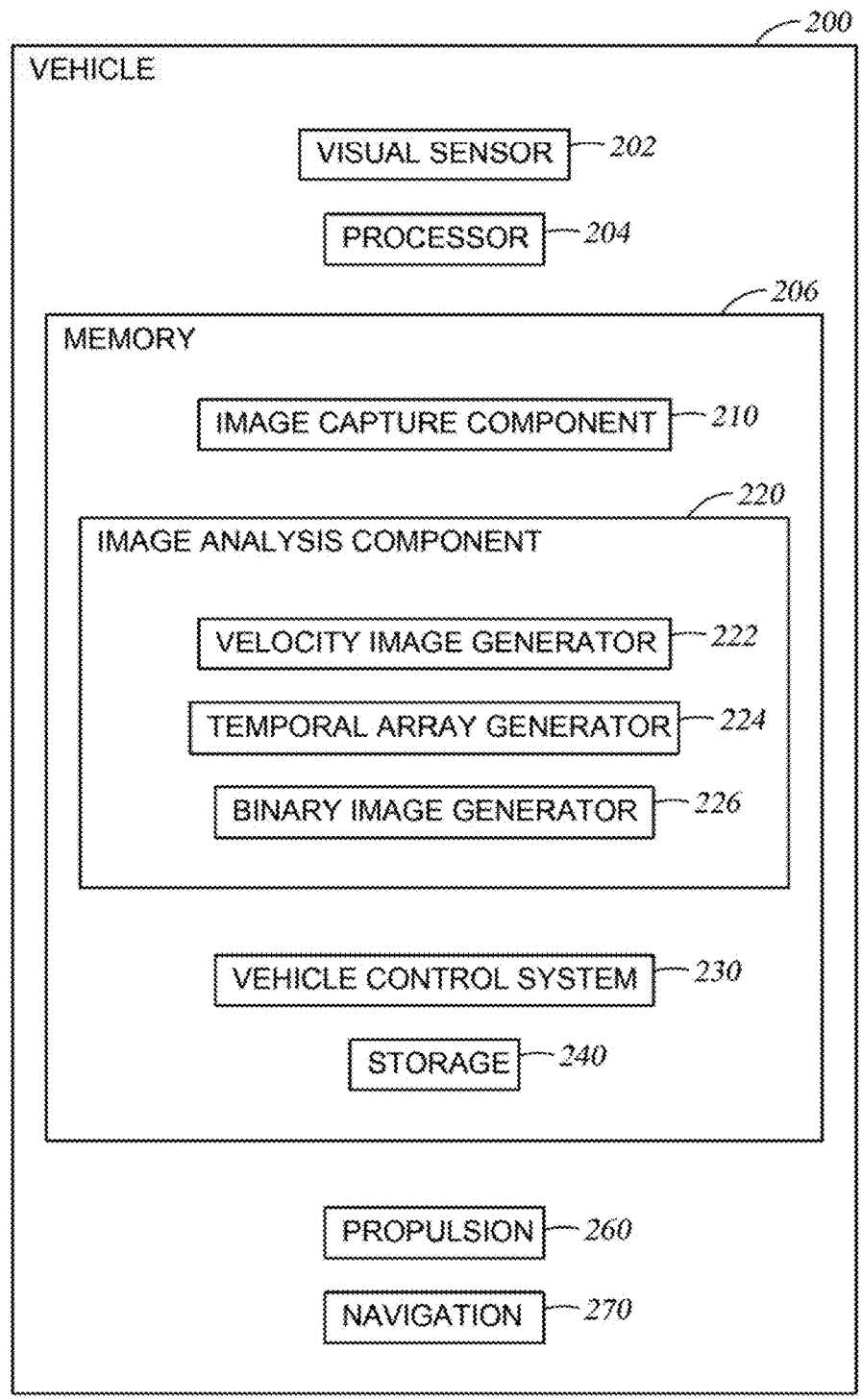
FIG. 2 is a block diagram illustrating an example vehicle, according to one embodiment described herein.

FIG. 2 is a block diagram illustrating an example vehicle 200. The vehicle 200 includes a visual sensor 202. As noted above, the visual sensor 202 can be a camera configured to sense visible light and/or infrared light, or any other suitable visual sensor. The vehicle 200 further includes a processor 204. The processor 204 generally retrieves and executes programming instructions stored in the memory 206. The processor 204 is included to be representative of a single central processing unit (CPU), multiple CPUs, a single CPU having multiple processing cores, graphics processing units (GPUs) having multiple execution paths, and the like. The memory 206 is generally included to be representative of electronic storage of any suitable type(s), including random access memory or non-volatile storage.

The memory 206 generally includes program code for performing various functions related to vehicle control and target tracking. The program code is generally described as various functional "applications," "components," or "modules" within the memory 206, although alternate implementations may have different functions and/or combinations of functions. Within the memory 206, the vehicle control system 230 is generally configured to control the vehicle 200, including controlling navigation of the vehicle 200 through a suitable propulsion system. The image capture component 210 controls capture of images from the visual sensor 202. The images captured by the image capture component 210 can be used for target tracking, as described in the subsequent figures.

The memory 206 further includes an image analysis component 220. The image analysis component 220 is generally used to analyze the images captured using the image capture component 210. The image analysis component 220 includes a velocity image generator 222. The velocity image generator 222 is used to generate a velocity image based on the images captured using the image capture component 210. The velocity image generator 222 is described in more detail with reference to subsequent figures.

The image analysis component 220 further includes a temporal array generator. The temporal array generator is used to generate a temporal deviation array from images captured using the image capture component 210, and is described in more detail with reference to FIG. 5. The image analysis component 220 further includes a binary image generator 226. The binary image generator 226 is used to generate a binary image based, at least in part, on the velocity image generated by the velocity image generator 222, the temporal deviation array generated by the temporal array generator 224, and two thresholds determined by the image analysis component 220. The binary image generator 226 is discussed in more detail with regard to FIG. 11.

The memory 206 further includes a storage 240. The storage 240 is used to store, for example, a series of binary images generated by the binary image generator 226, as discussed in more detail with regard to FIG. 11. The vehicle 200 further includes a propulsion system 260, used to propel the vehicle, and a navigation system 270. In one embodiment, the navigation system 270 can use a location and orientation of a target, as determined by the image analysis component 220, to facilitate navigation.

Figure 3:
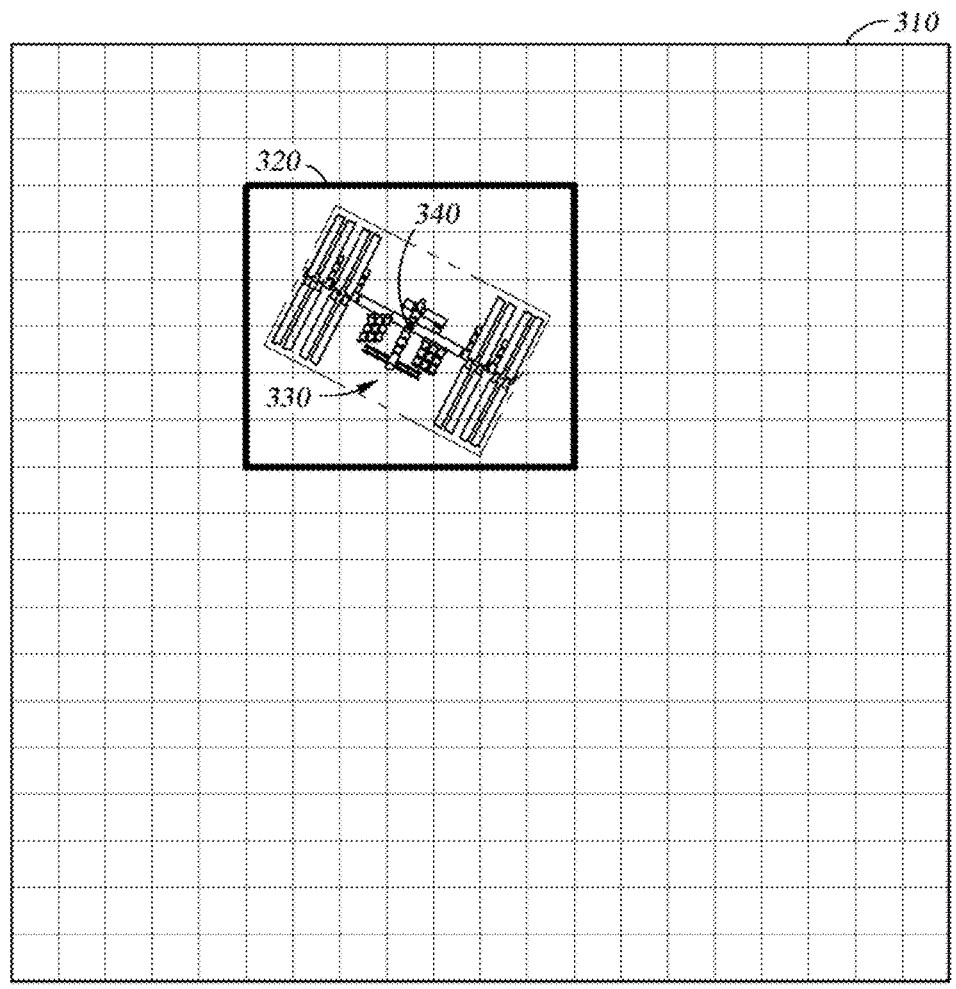
FIG. 3 is an illustration of an example digital image depicting a target object, according to one embodiment described herein.

FIG. 3 is an illustration of an image 310 captured by a focal plane array (FPA), for example an image captured by a visual sensor 202 and image capture component 210. A target 330 is shown in the image—this is the target which, for example, the vehicle 200 is tracking to facilitate navigation and docking. The tight bounding box (TBB) 320 is an optional, but generally desirable, bounding box generated to surround the target 330. The TBB 320 is constructed based on a given aim point location 340. The TBB 320 is computed to surround an expanded image of the target 330, such that it surrounds the target closely. But the TBB is computed such that there is a margin surrounding the target 330 to ensure that the target 330 is fully surrounded by the TBB. In an embodiment, the TBB can be computed based on information from additional sensors, target tracking in prior images, or any other suitable source. In one embodiment, as depicted in FIG. 3, the TBB 320 can be used in target tracking. But, as noted above, the TBB is optional. It is possible, for example, to simply use the edges and four corners of the image 310, in place of a TBB 320. Depending on the target, this may be sufficient.

Figure 4:
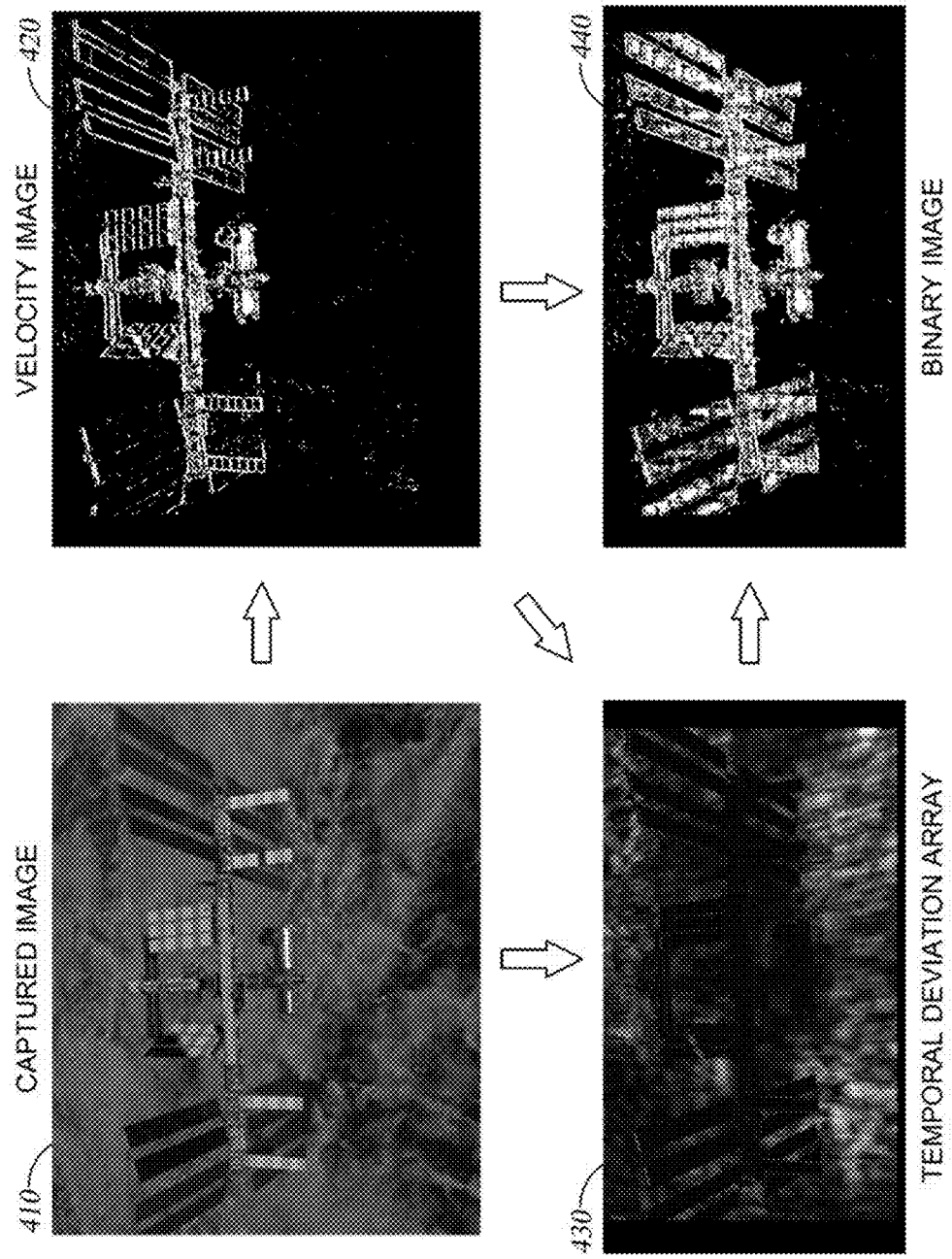
FIG. 4 is an illustration of a target tracking process for a digital image, according to one embodiment described herein.
Figure 5:
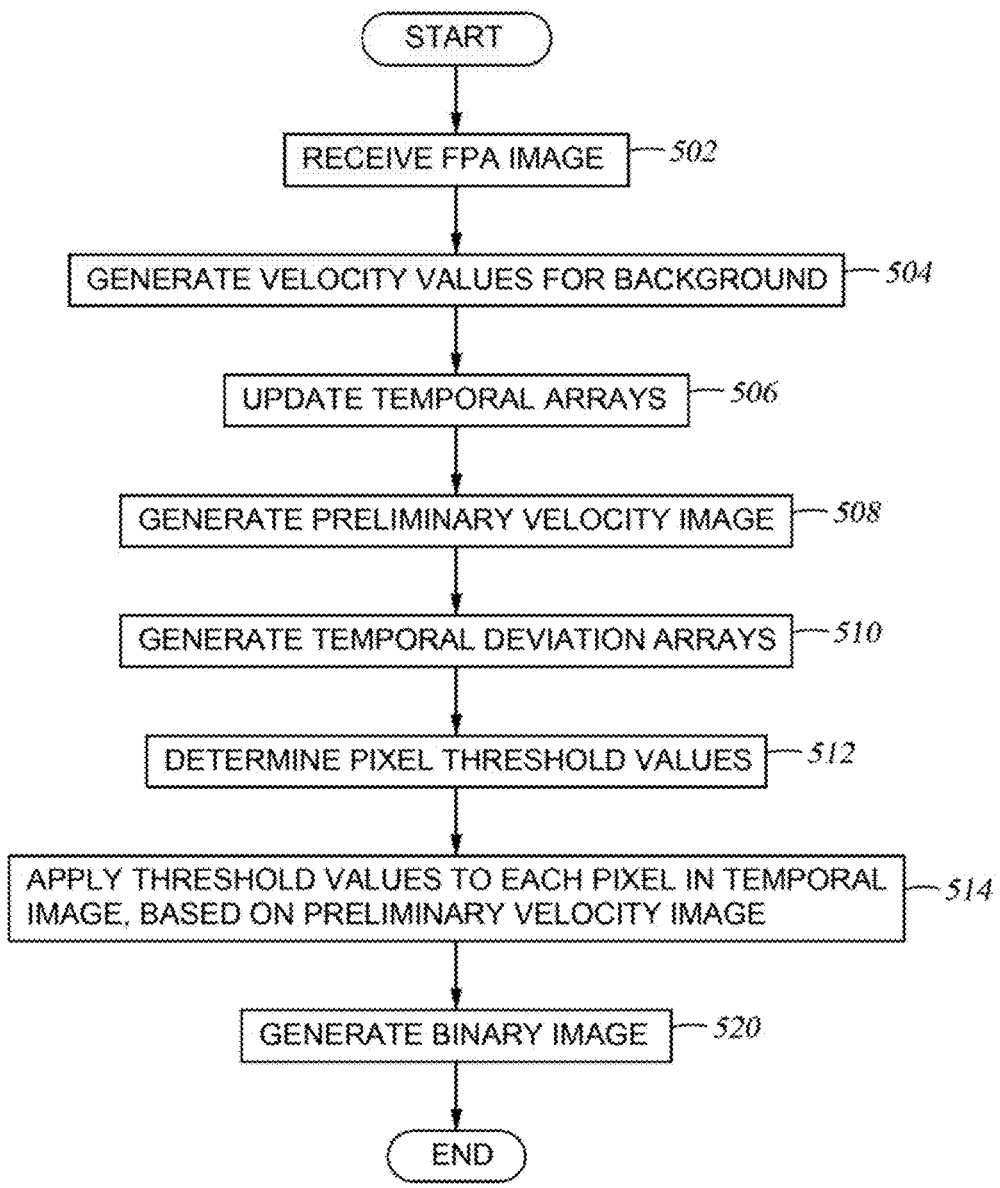
FIG. 5 is a flow chart of a target tracking process for a digital image, according to one embodiment described herein.

FIG. 4 illustrates an overview of the process by which the image analysis component 220 can generate a binary image separating the target from the background. FIG. 5 is a flowchart depicting the same process. FIGS. 4 and 5 can therefore be discussed together. At step 502 in FIG. 5, the image analysis component 220 receives a captured image, for example captured image 410 illustrated in FIG. 4. This could be, for example, an image captured by the visual sensor 202 and the image capture component 210. At step 504, the image analysis component 220 generates velocity values for pixels in the captured image 410 located outside of the TBB. Because the pixels are located outside the TBB, the image analysis component 220 can assume that the pixels represent the background and not the target. Step 504 is discussed in more detail with regard to FIGS. 6 and 7.

At step 506, the image analysis component 220 updates temporal arrays relating to the captured image 410. The image analysis component 220 can use, for example, two different temporal arrays: an array representing the temporal pixel intensities in the captured image 410 over a defined number of frames, and an array representing the temporal mean$^2$ of pixel intensities in the captured image 410 over that same defined number of frames. The temporal mean of a pixel is the mean intensity value of the pixel, from the first frame in a sequence through the current frame. The temporal mean$^2$ of a pixel is the mean of the squares of the intensity values of the pixel over the same sequence of frames. In an embodiment, the temporal values need only be calculated for pixels that exceed a detection threshold.

At step 508, the velocity image generator 222 generates a preliminary velocity image, for example velocity image 420 illustrated in FIG. 4. Velocity image 420 is a binary image with white pixels representing likely target pixels, and black pixels representing likely background pixels. The generation of velocity image 420 is discussed in more detail with regard to FIGS. 8 and 9.

At step 510, the temporal array generator 224 generates temporal deviation arrays based on the temporal arrays generated in step 506. Image 430 in FIG. 4 illustrates a temporal deviation array. The temporal deviation arrays represent the standard deviation of the mean intensity values for each pixel in the captured image 410, and can be calculated using a well-known standard deviation formula. For example, the formula $\sigma^2 = \langle \text{Mean}^2 \rangle - \langle \text{Mean} \rangle \langle \text{Mean} \rangle$ could be used, where $\sigma^2$ is the variance, Mean$^t$ is the temporal mean$^2$ discussed with reference to step 506, and Mean is the temporal mean discussed with reference to step 506. In one embodiment, if a detection threshold was used in step 506, any pixel that did not exceed the detection threshold is assigned a very large $\sigma$ value. In the deviation array, pixels with low standard deviation values correspond to pixels for which the intensity did not change much between frames—these are likely to be target pixels because the target remains generally stationary within the TBB 320 between frames. These are the black pixels in temporal deviation array 430. Pixels with higher standard deviation values correspond to pixels for which the intensity did change significantly between frames—these are likely to be background pixels or target-edge pixels, because the background and target edge is expected to move between frames. These are the white and grey pixels in temporal deviation array 430.

At step 512, the image analysis component determines two different threshold values to use in estimating whether a pixel is likely a target pixel or a background pixel. This is discussed in more detail with regard to FIG. 10. At steps 514 and 520, the appropriate threshold value is applied to each pixel to generate a binary image—both the temporal deviation array and the velocity image are used in this process. This is discussed in more detail with regard to FIG. 11. Binary image 440 is an example of a binary image generated by step 520: the white pixels represent the target pixels and the black pixels represent background pixels.

Figure 6:
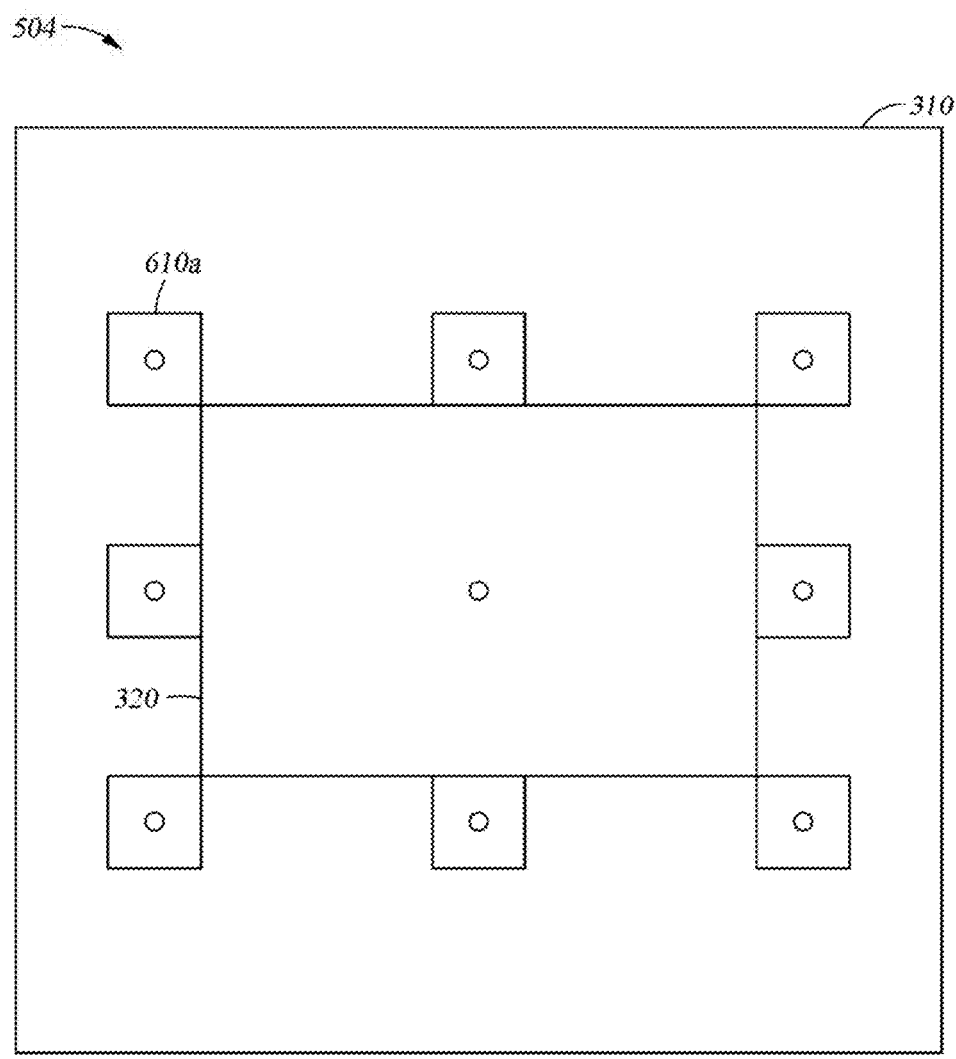
FIG. 6 is an illustration of generating pixel velocity values for a background portion of an image, according to one embodiment described herein.

FIG. 6 is an illustration of generating pixel velocity values for a background portion of an image. Pixel velocity is a measure of how much an object represented by a pixel in an image is moving from frame to frame. Because the TBB 320 is assumed to enclose the target, all pixels located outside the TBB 320 should represent the background portion of the image. Therefore, measuring the pixel velocity of pixels outside the TBB 320 provides the pixel velocity for the background portion of the image. In one embodiment, the image analysis component 220 could calculate the velocity value for each pixel outside the TBB 320.

Alternatively, one can divide the portion of the image outside the TBB 320 into a number of sampling windows 610. The velocity for the pixel located at the center of each of the sampling windows 610 can be calculated. The values of each of those pixels can then be interpolated. This allows for calculation of velocity for a much smaller number of pixels. For example, one could use eight sampling windows 610, as illustrated in FIG. 6, requiring calculation for only 8 pixels. One could also use a smaller, or larger, number of sampling windows, as appropriate. The sampling windows can be any suitable size, for example n pixels×m pixels, where n and m are each positive integers.

Figure 7:
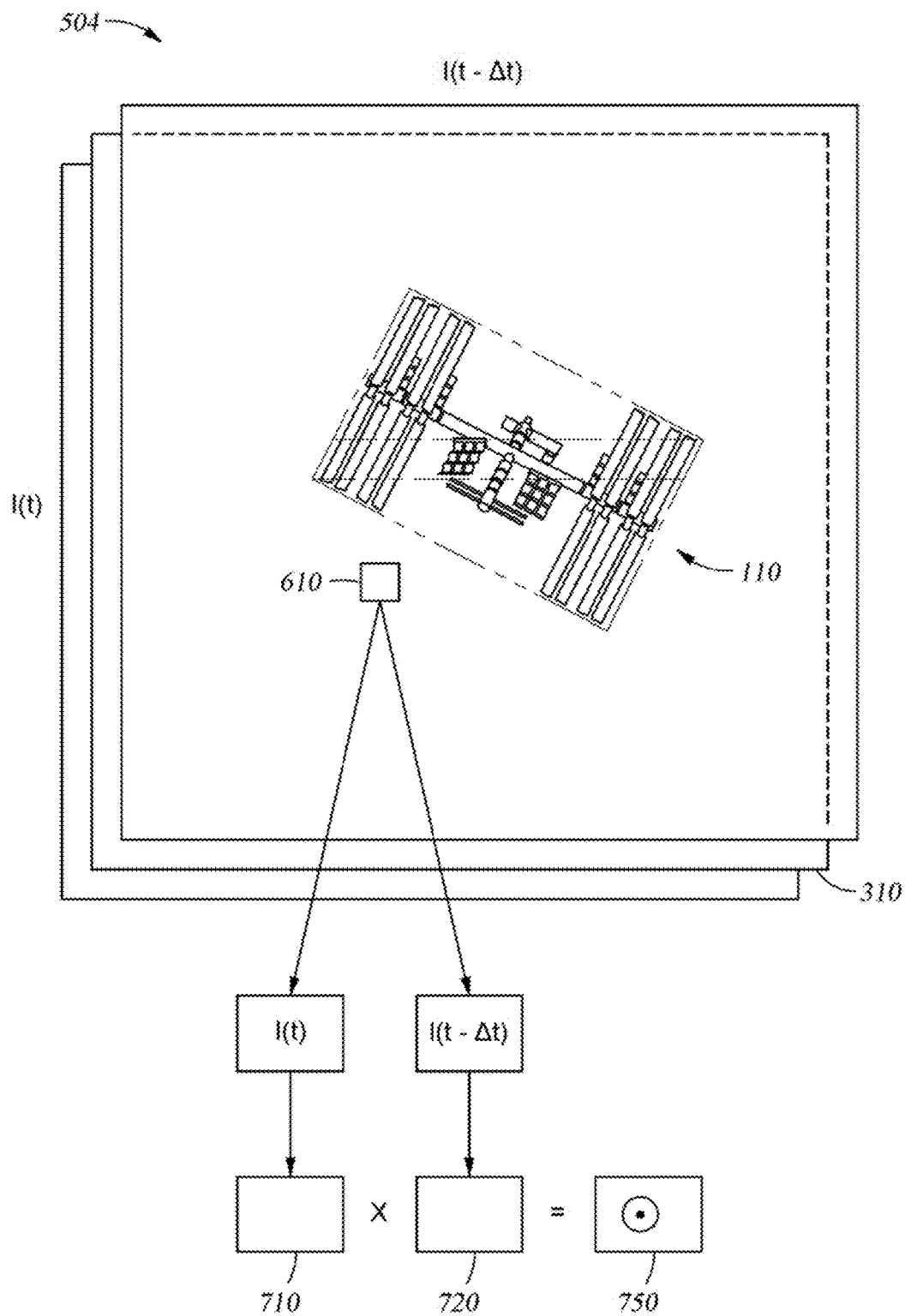
FIG. 7 is an illustration of the use of convolution in generating pixel velocity values for a background portion of an image, according to one embodiment described herein.

FIG. 7 is an illustration of one method for generating pixel velocity values for the sampling windows 610 illustrated in FIG. 6. As discussed below, other methods could also be used. The velocity of the background image represented by the pixels in each sampling window 610 is computed using the peak location in the convolution between the current and previous pixels corresponding to that sampling window. The pixels corresponding to the sampling window 610 are found in the current image and in a previous image. These two areas are passed through a Laplace transform to bring out high frequency components, and the transformed areas are convolved to create a convolution image. From the convolution image, the shift in the location of the peak from the center gives the frame-to-frame velocity. This velocity is measured in both an x and y direction.

For example, as illustrated in FIG. 7, image I(t) is a current frame. Image I(t−Δt) is a previous frame. Sampling window 610 is the window for which we are calculating the pixel velocity. The pixels in sampling window 610 for image I(t) and image I(t−Δt) are passed through transform 710, for example a Laplace transform. The results are then convolved, creating a resulting convolution image 750. The shift in location of the peak (e.g., the grey dot shown in convolution image 750) from the center of the window gives the frame-to-frame velocity between frames I(t−Δt) and I(t). This velocity has both an x component, along the x-axis of the window, and a y component, along the y-axis of the window.

As an alternative to the convolution method illustrated in FIG. 7, one could obtain the velocity for the pixels in the sampling windows using an analytical method, or any other suitable method. For example, if the expected background image is of earth, one could apply an analytical method. First, calculate the location on earth that the center of the sampling window is depicting. This can be calculated using the equation $R_{eci2fp}ECI = Q_{c2eci}*(Q_{cam2c}*R_{eci2fp}CAM)$. $R_{eci2fp}ECI$ is the location on the Earth that the pixels are representing, in Earth Centered Inertial (ECI) coordinates. $Q_{c2eci}$ is the attitude of the object tracking the target, for example vehicle 200 in FIG. 1, in ECI coordinates. Qhd cam2c is the camera attitude with regard to the vehicle coordinates. $R_{eci2fp}CAM$ is a vector from the ECI origin to the center of the pixel footprint in the camera coordinates.

Second, calculate the pixel location, within a second frame, of a previous frame's footprint location. $R_{eci2fp}ECI$, discussed above, represents the previous frame's footprint location. The new value can be calculated using the equation $R_{cam2fp}CAM = R_{cam2eci}CAM \ R_{eci2fp}CAM$. $R_{cam2eci}CAM$ represents a vector from the camera origin to the ECI origin, in camera coordinates. $R_{eci2fp}CAM$ represents a vector from the ECI origin to the center of the pixel footprint in camera coordinates. Third, calculate the pixel movement $(V_x, V_y)$ of the previous frame's window center. This can be calculated using the equation $(V_x, V_y) = (x^p, y^p) - (px, py)$. In this equation, $(x^p, y^p)$ represents the location in this frame of the previous frame's footprint. In the equation, (px,py) represents the previous frame's window center location. As discussed above, the pixel velocity value for a given sampling window 610 can be calculated using the convolution method described in relation to FIG. 7, using the analytical method described above, or using any other suitable method.

Figure 8:
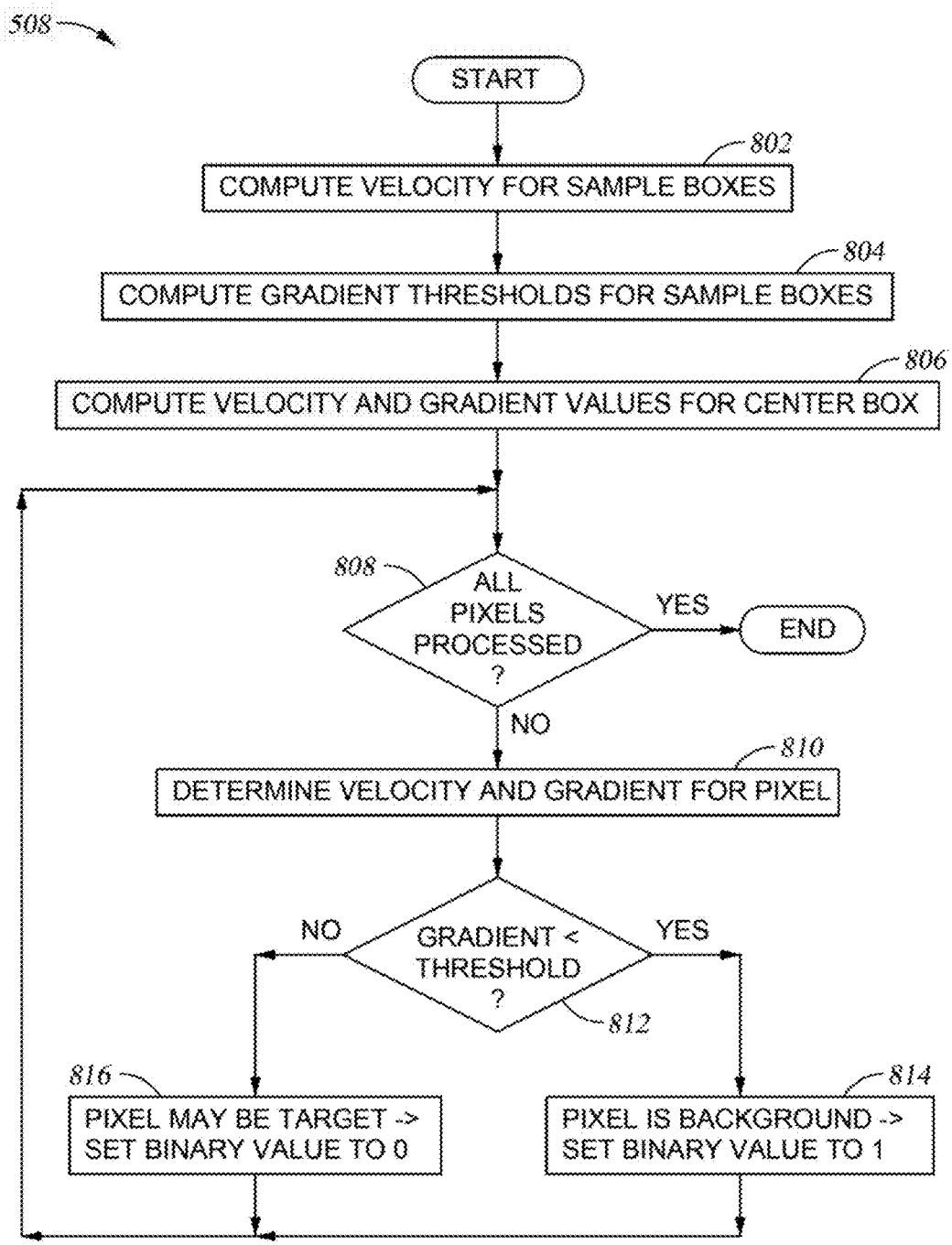
FIG. 8 is a flow chart illustrating generation of a velocity image, according to one embodiment described herein.

The next step after generating the pixel velocity values for the background is updating the temporal arrays. This is step 506 in FIG. 5, discussed above. After that, the next step is generating the preliminary velocity image for the pixels within the TBB 320. FIG. 8 is a flow chart illustrating this step. The resulting velocity image is a binary array in which every pixel set to "1" is a background pixel, and every pixel set to "0" may or may not be a target pixel. Pixels set to "0" are unknown because of the gradient method used to compute the pixel's state, discussed further with regard to steps 804-812 in FIG. 8. If the pixels in the area of interest are flat (e.g., nearly the same value as surrounding pixels), the pixels could either represent a relatively featureless portion of the target or a smooth portion of the background, like a white cloud or blue ocean if the background is the earth.

At step 802, the image analysis component 220 computes a velocity for the center pixel in each sampling window 610 outside the TBB. This is described with reference to FIGS. 6 and 7.

At step 804, the velocity image generator 222 computes a gradient threshold for each sampling window 610. The gradient threshold can be, for example, an average gradient value for each pixel in the sampling window 610. Alternatively, the gradient threshold could be a maximum gradient value for the pixels in the sampling window 610, a minimum gradient value for the pixels in the sampling window 610, or another value.

The gradient value for a pixel in the sampling window 610 can be determined using a gradient equation, for example: $v_x E_x + v_y E_y + E_t = 0$. In this equation, $v_x$ is the image velocity in the x direction for the pixel, $v_y$ is the image velocity in the y direction for the pixel, $E_x$ is the gradient in the x direction for the pixel, $E_y$ is the gradient in the y direction for the pixel, and $E_t$ is the time derivative for the pixel.

The gradient can be calculated for a 2-point derivative or a 3-point derivative. A 2-point derivative for a point is given by using the previous value for the point and a current value for the point. If the velocity is small and known, the 2-point gradient can be calculated using the equation $v_x E_x + v_y E_y + E_t = 0$ and the equations 1, 2 and 3, shown below, where, for these equations $\Delta x = \Delta y = \Delta t = 1$ and $v_i = \text{pixels/frame} = \text{pixels}/\Delta t < 1$:

$$E_x(x, y, t + \Delta t) = \frac{\partial E(x, y, t + \Delta t)}{\partial x} = \frac{1}{\Delta x}(E(x + \Delta x, y, t + \Delta t) - E(x, y, t + \Delta t))$$

Equation 1—2-Point Gradient in the X Direction for Small Velocity $$E_y(x, y, t + \Delta t) = \frac{\partial E(x, y, t + \Delta t)}{\partial y} = \frac{1}{\Delta y}(E(x, y + \Delta y, t + \Delta t) - E(x, y, t + \Delta t))$$

Equation 2—2-Point Gradient in the Y Direction for Small Velocity $$E_t(x, y, t + \Delta t) = \frac{\partial E(x, y, t + \Delta t)}{\partial t} = \frac{1}{\Delta t}(E(x, y, t + \Delta t) - E(x, y, t))$$

Equation 3—2-Point Time Derivative for Small Velocity

The 3-point derivative for a point is given by using the previous value for the point and the next value for the point.

Again if the velocity is small and known, the 3-point gradient can be calculated using the equation $v_x E_x + v_y E_y + E_t = 0$ and the equations 4, 5 and 6, shown below. For these equations, assume that $\Delta x = \Delta y = \Delta t = 1$ and $v_i = \text{pixels/frame} = \text{pixels}/\Delta t < 1$.

$$E_x(x, y, t+\Delta t) = \frac{\partial E(x, y, t+\Delta t)}{\partial x} = \frac{1}{2\Delta x}(E(x+\Delta x, y, t+\Delta t) - E(x, -\Delta x, y, t+\Delta t))$$

Equation 4—3-Point Gradient in the X Direction for Small Velocity $$E_y(x, y, t+\Delta t) = \frac{\partial E(x, y, t+\Delta t)}{\partial y} = \frac{1}{2\Delta y}(E(x, y+\Delta y, t+\Delta t) - E(x-\Delta y, y, t+\Delta t))$$

Equation 5—3-Point Gradient in the Y Direction for Small Velocity $$E_t(x, y, t+\Delta t/2) = \frac{\partial E(x, y, t+\Delta t/2)}{\partial t} = \frac{1}{\Delta t}(E(x, y, t+\Delta t) - E(x, y, t))$$

Equation 6—3-Point Time Derivative for Small Velocity

When the velocity is sufficiently large, however, the equations above may not be sufficient. This is because the image point may have moved many pixels from its corresponding location in the previous image, and so relying on a nearby pixel will not work. The correlation between image points needs to be re-obtained. This can be done by splitting the velocity into its integer and fraction parts $[V_x]$ and $v_x$, respectively. The 2-point gradient for a large velocity can be calculated using the equation $v_x E_x + v_y E_y + E_t = 0$ and the equations 7, 8, and 9, shown below. For these equations, assume that $V_x = [V_x] + v_x$, $V_y = [V_y] + v_y$, $\Delta x' = [V_x]$, $\Delta y' = [V_y]$, $\Delta x = \Delta y = \Delta t = 1$, $v_i = V_i - [V_i] < 1$, and $v_i = \text{pixels/frame} = \text{pixels}/\Delta t > 1$.

$$E_x(x, y, t+\Delta t) = \frac{\partial E(x, y, t+\Delta t)}{\partial x} = \frac{1}{\Delta x}(E(x+\Delta x, y, t+\Delta t) - E(x, y, t+\Delta t))$$

Equation 7—2-Point Gradient in the X Direction for Large Velocity $$E_y(x, y, t+\Delta t) = \frac{\partial E(x, y, t+\Delta t)}{\partial y} = \frac{1}{\Delta y}(E(x, y+\Delta y, t+\Delta t) - E(x, y, t+\Delta t))$$

Equation 8—2-Point Gradient in the Y Direction for Large Velocity $$E_t(x, y, t+\Delta t) = \frac{\partial E(x, y, t+\Delta t)}{\partial t} = \frac{1}{\Delta t}(E(x, y, t+\Delta t) - E(x-\Delta x', y-\Delta y', t))$$

Equation 9—2-Point Time Derivative for Large Velocity

The 3-point gradient for a large velocity can be calculated using the equation $v_x E_x + v_y E_y + E_t = 0$ and the equations 10, 11, and 12, shown below. For these equations, assume that $V_x = [V_x] + v_x$, $V_y = [V_y] + v_y$, $\Delta x' = [V_x]$, $\Delta y' = [V_y]$, $\Delta x = \Delta y = \Delta t = 1$, $v_i = V_i - [V_i] < 1$, and $v_i = \text{pixels/frame} = \text{pixels}/\Delta t > 1$.

$$E_x(x, y, t+\Delta t) = \frac{\partial E(x, y, t+\Delta t)}{\partial x} = \frac{1}{2\Delta x}(E(x+\Delta x, y, t+\Delta t) - E(x-\Delta x, y, t+\Delta t))$$

Equation 10—3-Point Gradient in the X Direction for Large Velocity $$E_y(x, y, t+\Delta t) = \frac{\partial E(x, y, t+\Delta t)}{\partial y} = \frac{1}{2\Delta y}(E(x, y+\Delta y, t+\Delta t) - E(x-\Delta y, y, t+\Delta t))$$

Equation 11—3-Point Gradient in the Y Direction for Large Velocity $$E_t(x, y, t+\Delta t/2) = \frac{\partial E(x, y, t+\Delta t/2)}{\partial t} = \frac{1}{\Delta t}(E(x, y, t+\Delta t) - E(x+\Delta x', y-\Delta y', t))$$

Equation 12—3-Point Time Derivative for Large Velocity

The average 3-point gradient for small velocities can be given by the equations 13, 14, and 15, shown below. In these equations, assume that $E_x$=gradient at $x+\frac{1}{2}$=the average of the x-gradients of pixel (x,y) at time t, pixel (x,y+1) at time t, and both pixels for t+1. $E_y$=gradient at $y+\frac{1}{2}$=the average of the y-gradients of pixel (x,y) at time t, pixel (x+1,y) at time t, and both pixels for t+1. $E_t$=derivative at $t+\frac{1}{2}$=the average of the t-gradients of pixel (x,y), (x,y+1), (x+1,y) and (x+1,y+1) at time t+1.

$$E_x\left(x+\frac{1}{2}, y+\frac{1}{2}, t+\frac{1}{2}\right) =$$

-continued $$\frac{\partial E\left(x+\frac{1}{2}, y+\frac{1}{2}, t+\frac{1}{2}\right)}{\partial x} = \frac{1}{4\Delta x}((E(x+1, y, t) + E(x+1, y+1, t) +$$
$$E(x, y+1, t+1) + E(x+1, y+1, t+1)) -$$
$$(E(x, y, t) + E(x+1, y, t) + E(x, y, t+1) + E(x+1, y, t+1)))$$

Equation 13—Average 3-Point Gradient in the X Direction for Small Velocity $$E_y\left(x+\frac{1}{2}, y+\frac{1}{2}, t+\frac{1}{2}\right) =$$
$$\frac{\partial E\left(x+\frac{1}{2}, y+\frac{1}{2}, t+\frac{1}{2}\right)}{\partial y} = \frac{1}{4\Delta y}((E(x, y+1, t) + E(x+1, y+1, t) +$$
$$E(x, y+1, t+1) + E(x+1, y+1, t+1)) -$$
$$(E(x, y, t) + E(x+1, y, t) + E(x, y, t+1) + E(x+1, y, t+1)))$$

Equation 14—Average 3-Point Gradient in the Y Direction for Small Velocity $$E_t\left(x+\frac{1}{2}, y+\frac{1}{2}, t+\frac{1}{2}\right) =$$
$$\frac{\partial E\left(x+\frac{1}{2}, y+\frac{1}{2}, t+\frac{1}{2}\right)}{\partial t} = \frac{1}{4\Delta t}((E(x, y, t+1) + E(x+1, y, t+1) +$$
$$E(x, y+1, t+1) + E(x+1, y+1, t+1)) -$$
$$(E(x, y, t) + E(x+1, y, t) + E(x, y+1, t) + E(x+1, y+1, t)))$$

Equation 15—Average 3-Point Time Derivative for Small Velocity

The average 3 point gradient for large velocities can be given by the equations 16, 17, and 18 shown below. For these equations, assume $V_x=[V_x]+v_x$, $V_y=[V_y]+v_y$, $\Delta x'=[V_x]$, $\Delta y'=[V_y]$, $\Delta x=\Delta y=\Delta t=1$, $v_i=V_i-[V_i]<1$, and $v_i$=pixels/frame=pixels/$\Delta t$>1.

$$E_x\left(x-\frac{\Delta x'}{2}+\frac{1}{2}, y-\frac{\Delta y'}{2}+\frac{1}{2}, t+\frac{1}{2}\right) =$$
$$\frac{\partial E\left(x-\frac{\Delta x'}{2}+\frac{1}{2}, y-\frac{\Delta y'}{2}+\frac{1}{2}, t+\frac{1}{2}\right)}{\partial x} =$$
$$\frac{1}{4\Delta x}((E(x-\Delta x'+1, y-\Delta y', t) + E(x-\Delta x'+1, y-\Delta y'+1, t) +$$
$$E(x+1, y, t+1) + E(x+1, y+1, t+1)) -$$
$$(E(x-\Delta x', y-\Delta y', t) + E(x-\Delta x', y-\Delta y'+1, t) +$$
$$E(x, y, t+1) + E(x, y+1, t+1)))$$

Equation 16—Average 3-Point Gradient in the X Direction for Large Velocity $$E_y\left(x-\frac{\Delta x'}{2}+\frac{1}{2}, y-\frac{\Delta y'}{2}+\frac{1}{2}, t+\frac{1}{2}\right) =$$
$$\frac{\partial E\left(x-\frac{\Delta x'}{2}+\frac{1}{2}, y-\frac{\Delta y'}{2}+\frac{1}{2}, t+\frac{1}{2}\right)}{\partial y} =$$
$$\frac{1}{4\Delta y}((E(x-\Delta x', y-\Delta y'+1, t) + E(x-\Delta x'+1, y-\Delta y'+1, t) +$$
$$E(x, y+1, t+1) + E(x+1, y+1, t+1)) -$$
$$(E(x-\Delta x', y-\Delta y', t) + E(x-\Delta x'+1, y-\Delta y', t) +$$
$$E(x, y, t+1) + E(x+1, y, t+1)))$$

Equation 17—Average 3-Point Gradient in the Y Direction for Large Velocity $$E_t\left(x-\frac{\Delta x'}{2}+\frac{1}{2}, y-\frac{\Delta y'}{2}+\frac{1}{2}, t+\frac{1}{2}\right) =$$
$$\frac{\partial E\left(x-\frac{\Delta x'}{2}+\frac{1}{2}, y-\frac{\Delta y'}{2}+\frac{1}{2}, t+\frac{1}{2}\right)}{\partial t} =$$
$$\frac{1}{4\Delta t}((E(x, y, t+1) + E(x+1, y, t+1) +$$
$$E(x, y+1, t+1) + E(x+1, y+1, t+1)) -$$
$$(E(x-\Delta x', y-\Delta y', t) + E(x-\Delta x'+1, y-\Delta y', t) +$$
$$E(x-\Delta x', y-\Delta y'+1, t) + E(x-\Delta x'+1, y-\Delta y'+1, t)))$$

Equation 18—Average 3-Point Time Derivative for Large Velocity

When calculating the gradient for large velocities, as discussed above, the goal is to select an area of an image at time t and obtain the gradient of that same area at time t+½. But the area may be at a different location within the image at time t+½, because of the large pixel velocities. Because we know the velocity, however, we can calculate the location of the area in the image at time t and time t+$\Delta$t. The location of the area at time t is x(t). The location of the area at time t+$\Delta$t is x(t+40=x(t)+$v_x$*$\Delta$t. In this equation $\Delta$t could have any suitable value, for example, $\Delta$t could be 1. We can then use these values to calculate the location of the area at time t+½, and can calculate the gradient of the area accordingly.

Further, as discussed above, when calculating the gradient for large velocities, it can be helpful to divide the velocity into integer and fractional components. The fractional component represents the apparent velocity relative to a chosen area. The fractional component, $v_x$, can be calculated using the equation below (where $[V_x]$ is the integer component):

$$x(t+1) = \begin{cases} x(t) & |V_x| < 2 \\ x(t) + [V_x] - 1 & V_x \geq 2 \\ x(t) - [|V_x|] + 1 & V_x \leq -2 \end{cases} \text{ and } v_x = \begin{cases} V_x & |V_x| < 2 \\ V_x - [V_x] + 1 & V_x \geq 2 \\ V_x + [|V_x|] - 1 & V_x \leq -2 \end{cases}$$

In one embodiment, the gradient threshold is calculated at step 804, for each sampling window 610, by obtaining the window's fractional velocity ($v_x,v_y$) using the total velocity ($V_x,V_y$):

$$v_x = \begin{cases} V_x & |V_x| < 2 \\ V_x - [V_x] + 1 & V_x \geq 2 \\ V_x + [|V_x|] - 1 & V_x \leq -2 \end{cases} \text{ and } v_y = \begin{cases} V_y & |V_y| < 2 \\ V_y - [V_y] + 1 & V_y \geq 2 \\ V_y + [|V_y|] - 1 & V_y \leq -2 \end{cases}$$

The velocity image generator 222 then finds the shift in position of a time t image pixel from a previous frame (t) to a current frame (t+1) (e.g., given a background pixel in the previous frame, find that same pixel's location in the current frame). This can be done using the equations:

$$x(t+1) = \begin{cases} x(t) & |V_x| < 2 \\ x(t) + [V_x] - 1 & V_x \geq 2 \\ x(t) - [|V_x|] + 1 & V_x \leq -2 \end{cases} \text{ and } y(t+1) = \begin{cases} y(t) & |V_y| < 2 \\ y(t) + [V_y] - 1 & V_y \geq 2 \\ y(t) - [|V_y|] + 1 & V_y \leq -2 \end{cases}$$

Using each pixel in the sampling window 610, the velocity image generator 222 can compute the gradient equation for that pixel using the equation $v_x E_x + v_y E_y + E_t = 0$, where $E_x$, $E_y$, and $E_t$ are calculated using the large-velocity 3-point gradient equations described above. The velocity image generator 222 then calculates the absolute value of the gradient equation.

The velocity image generator 222 then computes the maximum gradient equation value ($\text{Grad}_{max}$) for the pixels in each sampling window 610, as well as the average ($M_{GradEq}$) and standard deviation ($\sigma$) for the gradient equation values. The instantaneous gradient threshold for a sampling window 610 is given by the equation: $IT_{Grad} = 3*\sqrt{6}*\sigma$, where $IT_{Grad}$ is the instantaneous gradient threshold. If $IT_{Grad}$ is greater than $\text{Grad}_{max}$, then $IT_{Grad}$ is set to $\text{Grad}_{max}$. If the average could not be computed satisfactorily, then the average can be computed using the equation: $IT_{Grad} = M_{GradEq} - 0.9*(\text{Grad}_{max} - M_{GradEq})$. If $IT_{Grad}$ cannot be calculated satisfactorily, then it is set to $2*\text{Grad}_{max}$. The gradient threshold is further checked using a running average filter for the sampling window's gradient threshold. If the gradient threshold falls within three standard deviations of the running average, then the threshold is considered valid, and the running average is updated. The final gradient threshold for the window is obtained from the running average. If no final gradient threshold can be determined, the sampling window is tagged as invalid and assigned a value using the average of its two nearest valid neighbors.

Figure 9:
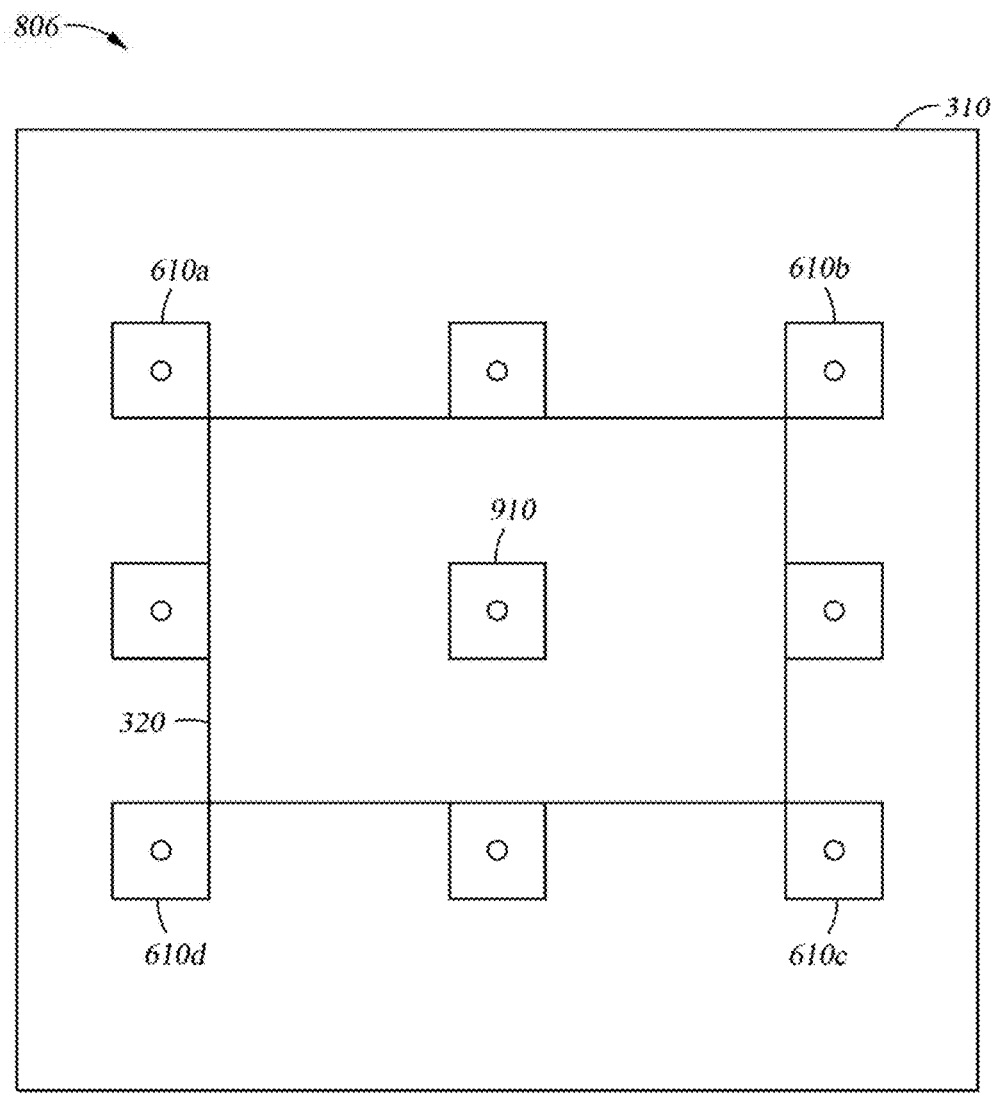
FIG. 9 is an illustration of generation of a velocity image, according to one embodiment described herein.

At step 806, the velocity image generator 222 computes velocity and gradient values for a center window located inside the TBB at the center of the sampling windows 610a-d. This is illustrated in FIG. 9. Eight sampling windows 610 are located outside the TBB 320 within the image 310. A center window 910 is located at the center of the sampling windows 610a-d.

The center window 910's velocity and gradient are determined by square interpolating the velocity and gradient values of the four corner sampling windows 610a, 610b, 610c, and 610d. For example, given the values of four pixels ($v_1, v_2, v_3, v_4$) in the image that make a rectangle whose corners are at $(x_1,y_1),(x_2,y_1),(x_2,y_2),(x_1,y_2)$, the interpolated value of the pixel located at (x,y) inside the rectangle is given by:

$$V = \frac{d_2 d_4 v_1 + d_2 d_3 v_2 + d_1 d_3 v_3 + d_1 d_4 v_4}{(d_1 + d_2)(d_3 + d_4)}, \text{ where } d_1 = x - x_1,$$

$$d_2 = x_2 - x, d_3 = y - y_1 \text{ and } d_4 = y_2 - y.$$

Returning to FIG. 8, at step 808, the velocity image generator 222 determines whether all pixels in the velocity image have been processed. If so, the process ends. If not, the process proceeds to step 810. At step 810, the velocity, gradient threshold, and gradient are determined for each pixel in the velocity image. Each pixel is classified as being inside the TBB 320, or outside the TBB 320. If the pixel is outside the TBB 320, the pixel's velocity and gradient threshold are the value of the closest sampling window 610.

Otherwise, the pixel's velocity and gradient threshold value is found by distance interpolating the values of the four closest sampling windows 610. For example, given the values of four pixels ($v_1, v_2, v_3, v_4$) in the image located at $(x_1,y_1),(x_2,y_2),(x_3,y_3),(x_4,y_4)$, the distance interpolated value of the pixel located at (x,y) inside the surrounding area is given by:

$$V = \frac{\sum_{i=1}^{4} D_{[i+1]} D_{[i+2]} D_{[i+3]} v_i}{\sum_{i=1}^{4} D_{[i+1]} D_{[i+2]} D_{[i+3]}},$$

where [ ] is a wraparound function such that given [x], if x>4, then x=x-4. In this equation, $D_i = ((x-x_i)^2 + (y-y_i)^2)^n$ with n=1. The gradient is determined for each pixel using the pixel's velocity: $GradEq_p = v_{xp} E_{xp} + v_{yp} E_{yp} + E_{tp}$.

At step 812, the absolute value of the gradient for each pixel is compared with the gradient threshold for the pixel. At step 814, if the absolute value of the gradient is less than the threshold, the pixel is tagged as a background pixel and the value in the velocity image corresponding to that pixel is set to 1. Otherwise, at step 816, the pixel is tagged as a target pixel and the binary value is set to 0. The velocity image generator 222 then returns to step 808.

After the preliminary velocity image is generated (step 508 in FIG. 5), the next step is to generate the temporal deviation arrays: this is discussed with regard to step 510 in FIG. 5. After the temporal deviation array is generated, it is copied and sorted in an ascending order into a linear array. The sorted array is passed through a low pass averaging filter (e.g., with size=5) to get the final sorted linear array.

Figure 10:
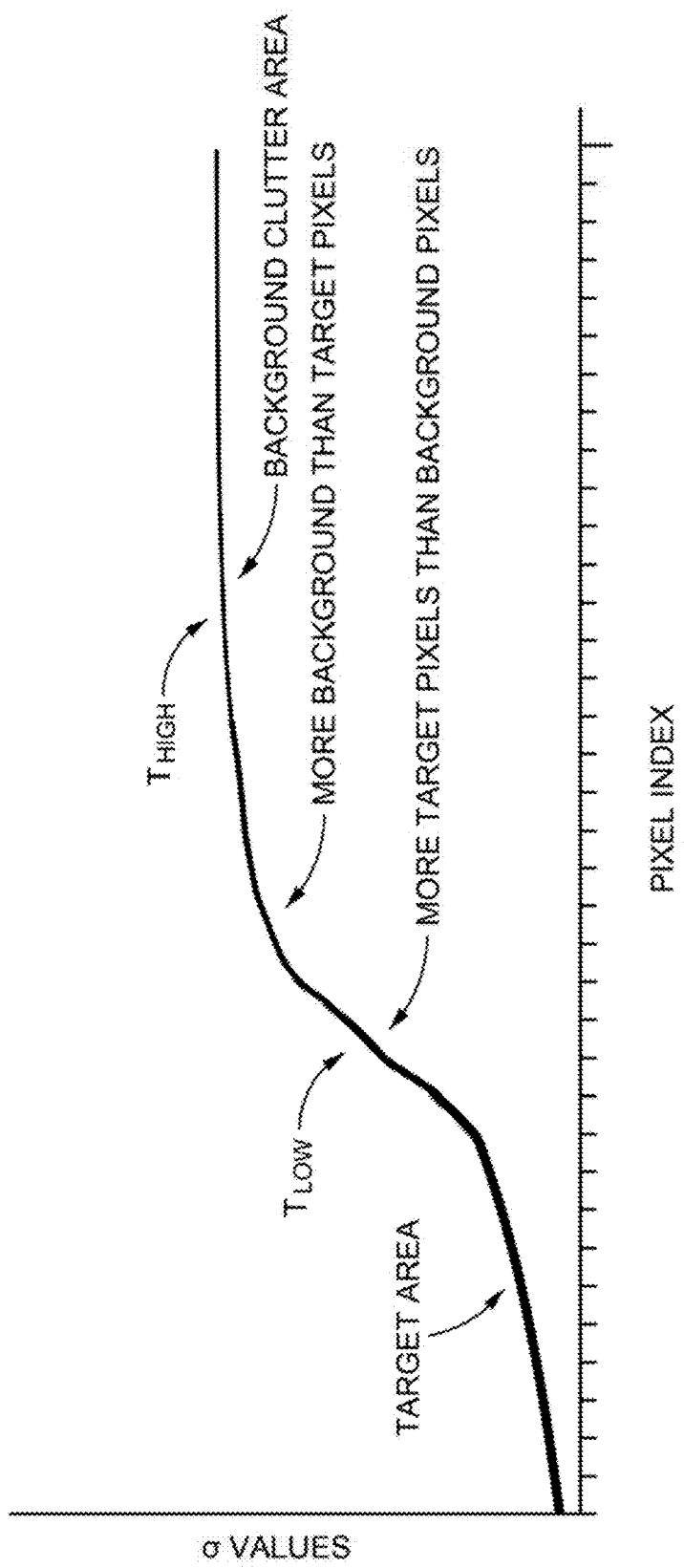
FIG. 10 is an illustration of computing thresholds for likely target pixels and background pixels, according to one embodiment described herein.

FIG. 10 illustrates determining two pixel threshold values, a lower threshold and a higher threshold, using this sorted linear array of temporal deviation values for the pixels in the image. The y axis represents the standard deviation of the temporal value for each pixel, as discussed above with regard to step 510 in FIG. 5. The x axis is the pixel index (e.g., the index of the pixel in the sorted linear array). In this graph, pixels with lower values are expected to be target pixels (less change in pixel intensity between frames) and pixels with higher values are expected to be background pixels (more change in pixel intensity between frames).

The lower threshold can be determined by finding the maximum slope of the sorted linear array. For example, the lower threshold could be the standard deviation value at the point in the curve marked $T_{low}$ in FIG. 10. The slope is computed by using a 5 point derivative for the $i^{th}$ pixel: $d_i=(-A_{i+2\Delta}+8*A_{1+\Delta}-8A_{i-1}+A_{i-2\Delta})/12\Delta$, where $\Delta$ is determined by the size of the sorted linear array.

The higher threshold can be found by finding the value of the sorted linear array at the index given by the expected number of pixels in the target portion of the image. This index can be found by multiplying the expected number of pixels in the target portion by 1.5. The expected number of pixels for the target can come from previous target images or from a library image of the target. The higher threshold is denoted, for example, as $T_{high}$ in FIG. 10. Each threshold can be further checked against its own corresponding running sum filter.

The process illustrated in FIG. 10 is just one way of determining the lower and higher pixel threshold values. These threshold can be calculated in many suitable ways, including analyzing only pixels inside the TBB 320 and/or using the standard deviation at the pixel in a particular percentile of the array (e.g., the $10^{th}$ percentile), along with the higher threshold, to determine the lower threshold (e.g., $T_{low}=(T_{high}+T_{percentile})/2$).

Figure 11:
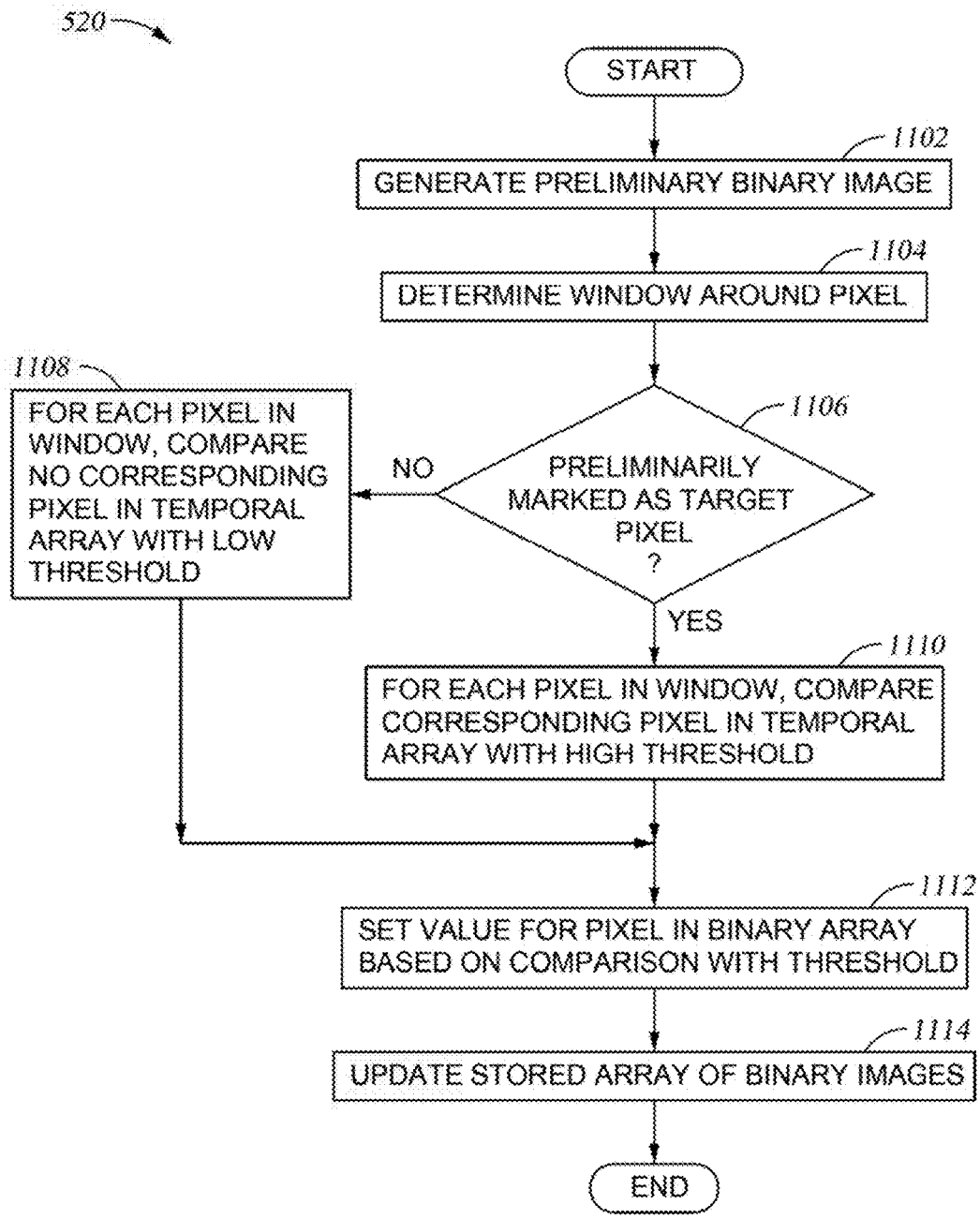
FIG. 11 is a flow chart illustrating generating a binary image, according to one embodiment described herein.

FIG. 11 illustrates generating the binary image. At step 1102, the binary image generator 226 generates a preliminary binary image by copying the velocity image into the binary image, reversing the binary values—where the velocity image had a value of "1", the binary image is set to "0", and where the velocity image had a value of "0", the binary image is set to "1". The pixels set to "1" in the preliminary binary image thus represent possible target pixels.

At step 1104, a small N×N window is created around each pixel in the binary array. For example, N could be 2% of the size of TBB 320. At step 1106, each pixel is analyzed to determine whether it is preliminarily marked as a target pixel. If the pixel is preliminarily marked as a target pixel, at step 1110 the binary image generator 226 identifies the corresponding pixel in the temporal deviation array. The binary image generator 226 also identifies the pixels in the N×N window associated with the subject pixel, in the temporal deviation array. The temporal deviation array value for each pixel is compared with the higher threshold $T_{high}$ determined earlier (as described in connection with FIG. 10). If the temporal deviation value is $<T_{high}$, the corresponding pixel in the binary image is marked as "1", denoting a target pixel. This more generous threshold is used because the pixel is presumed to be a target pixel.

Returning to step 1106, if the pixel was not preliminarily marked as a target pixel, the binary image generator 226 proceeds to step 1108. Step 1108 proceeds similarly to step 1110, except the lower threshold value $T_{low}$ is used for the comparison. The binary image generator 226 identifies the corresponding pixel in the temporal deviation array. The binary image generator 226 also identifies the pixels in the N×N window associated with the subject pixel, in the temporal deviation array. The temporal deviation array value for each pixel is compared with the lower threshold value $T_{low}$ determined earlier (as described in connection with FIG. 10). If the temporal deviation value is $<T_{high}$, the corresponding pixel in the binary image is marked as "1", denoting a target pixel. This less generous threshold is used because the pixel is presumed to be a background pixel, and not a target pixel.

At step 1114, the image analysis component stores the binary image for use by, for example, a vehicle's navigation system. In an embodiment, an array of previous binary images can be maintained, with the newest binary image replacing the oldest binary image in the array. A vehicle's navigation system (e.g., navigation system 270 of vehicle 200) can use the array of binary images, which denote the location and orientation of the target, to assist in navigation to and docking with the target.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" or "the disclosure" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

Embodiment of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method for controlling navigation of a vehicle by tracking a location and orientation of a target in a digital image, the method comprising:
   receiving a digital image captured by a visual sensor;
   generating a first array comprising a plurality of binary values related to a pixel velocity of a first plurality of pixels in the digital image as compared to corresponding pixels in a first one or more prior digital images;
   generating a second array comprising a plurality of values related to a standard deviation of pixel intensity of the first plurality of pixels in the digital image as compared to corresponding pixels in a second one or more prior digital images;
   determining a plurality of thresholds relating to the values in the second array;
   identifying a plurality of target pixels and a plurality of background pixels in the digital image, based on the first array, the second array, and the plurality of thresholds;
   generating a binary image related to the digital image, based on the identified plurality of target pixels and the identified plurality of background pixels;
   identifying at least one of a location and an orientation of the target in the digital image based on the binary image; and transmitting a command to a navigation system for the vehicle, to assist in navigating the vehicle toward the target, based on the identified at least one of the location and the orientation of the target.

2. The method of claim 1, wherein the plurality of thresholds comprises a first threshold and a second threshold, wherein the first threshold is higher than the second threshold, and wherein identifying the plurality of target pixels and the plurality of background pixels in the digital image further comprises:
determining that a first pixel is marked as a target pixel in the first array;
identifying an entry in the second array corresponding to the first pixel;
determining that the entry in the second array is less than the first threshold, and in response identifying the first pixel as a target pixel;
determining that a second pixel is marked as a background pixel in the first array;
identifying an entry in the second array corresponding to the second pixel; and
determining that the entry in the second array is greater than or equal to the second threshold, and in response identifying the second pixel as a background pixel.

3. The method of claim 1, further comprising:
receiving boundary information sufficient to form a bounding box around the target in the digital image, wherein generating the first array related to the digital image further comprises:
identifying a plurality of sampling windows in the digital image located outside the bounding box;
determining a pixel velocity value for a pixel located inside each of the plurality of sampling windows; and
determining the plurality of binary values related to the pixel velocity of a first plurality of pixels in the digital image as compared to corresponding pixels in a first one or more prior digital images based, at least in part, on the determined pixel velocities for the pixels located inside the plurality of sampling windows.

4. The method of claim 1, further comprising:
determining a gradient value for a pixel in the first plurality of pixels;
determining a gradient threshold for the pixel in the first plurality of pixels; and
determining the binary value in the first array for the pixel based, at least in part, on a comparison of the gradient value for the pixel with the gradient threshold for the pixel.

5. The method of claim 1, further comprising:
storing the binary image in an electronic database, the electronic database comprising a plurality of binary images related to images captured by the visual sensor, wherein identifying at least one of a location and an orientation of the target is further based on the plurality of binary images.

6. A method for tracking a location and orientation of a target in a digital image, the method comprising:
receiving a digital image captured by a visual sensor;
generating a first array comprising a plurality of binary values related to a pixel velocity of a first plurality of pixels in the digital image;
generating a second array comprising a plurality of values related to a standard deviation of pixel intensity of the first plurality of pixels in the digital image;
identifying a plurality of target pixels and a plurality of background pixels in the digital image, based on the first array and the second array; and
identifying at least one of a location and an orientation of the target in the digital image based on the identified plurality of target pixels and a plurality of background pixels.

7. The method of claim 6, wherein the plurality of binary values in the first array are related to the pixel velocity of pixels in the digital image as compared to pixels in a first one or more prior digital images and wherein the plurality of values in the second array are related to the standard deviation of pixel intensity of pixels in the digital image as compared to pixels in a second one or more prior digital images, the method further comprising:
determining a plurality of thresholds relating to the values in the second array, wherein identifying the plurality of target pixels and the plurality of background pixels in the digital image is further based on the plurality of thresholds.

8. The method of claim 6, further comprising transmitting a command to a navigation system for a vehicle, to assist in navigating the vehicle toward the target, based on the identified at least one of a location and an orientation of the target.

9. The method of claim 6, further comprising:
generating a binary image related to the digital image, based on the identified plurality of target pixels and the identified plurality of background pixels, wherein identifying at least one of a location and an orientation of the target in the digital image is further based on the binary image.

10. The method of claim 6, further comprising:
receiving boundary information sufficient to form a bounding box around the target in the digital image, wherein generating the first array related to the digital image further comprises:
identifying a plurality of sampling windows in the digital image located outside the bounding box;
determining a pixel velocity value for a pixel located inside each of the plurality of sampling windows; and
determining the plurality of binary values related to the pixel velocity of a first plurality of pixels in the digital image based, at least in part, on the determined pixel velocities for the pixels located inside the plurality of sampling windows.

11. The method of claim 6, further comprising:
determining a gradient value for a pixel in the first plurality of pixels;
determining a gradient threshold for the pixel in the first plurality of pixels; and
determining the binary value in the first array for the pixel based, at least in part, on a comparison of the gradient value for the pixel with the gradient threshold for the pixel.

12. The method of claim 7, wherein the plurality of thresholds comprises a first threshold and a second threshold, wherein the first threshold is higher than the second threshold, and wherein identifying the plurality of target pixels and the plurality of background pixels in the digital image further comprises:
determining that a first pixel is marked as a target pixel in the first array;
identifying an entry in the second array corresponding to the first pixel;

determining that the entry in the second array is less than the first threshold, and in response identifying the first pixel as a target pixel;

determining that a second pixel is marked as a background pixel in the first array;

identifying an entry in the second array corresponding to the second pixel; and determining that the entry in the second array is greater than or equal to the second threshold, and in response identifying the second pixel as a background pixel.

13. The method of claim 9, further comprising:

storing the binary image in an electronic database, the electronic database comprising a plurality of binary images related to images captured by the visual sensor, wherein identifying at least one of a location and an orientation of the target is further based on the plurality of binary images.

14. A system comprising:

a processor; and a memory storing a program, which, when executed on the processor, performs an operation, the operation comprising:

receiving a digital image captured by a visual sensor;

generating a first array comprising a plurality of binary values related to a pixel velocity of a first plurality of pixels in the digital image;

generating a second array comprising a plurality of values related to a standard deviation of pixel intensity of the first plurality of pixels in the digital image;

identifying a plurality of target pixels and a plurality of background pixels in the digital image, based on the first array and the second array; and identifying at least one of a location and an orientation of the target in the digital image based on the identified plurality of target pixels and a plurality of background pixels.

15. The system of claim 14, wherein the plurality of binary values in the first array are related to the pixel velocity of pixels in the digital image as compared to pixels in a first one or more prior digital images and wherein the plurality of values in the second array are related to the standard deviation of pixel intensity of pixels in the digital image as compared to pixels in a second one or more prior digital images, the operation further comprising:

determining a plurality of thresholds relating to the values in the second array, wherein identifying the plurality of target pixels and the plurality of background pixels in the digital image is further based on the plurality of thresholds.

16. The system of claim 14, the operation further comprising transmitting a command to a navigation system for a vehicle, to assist in navigating the vehicle toward the target based on the identified at least one of a location and an orientation of the target.

17. The system of claim 14, the operation further comprising:

generating a binary image related to the digital image, based on the identified plurality of target pixels and the identified plurality of background pixels, wherein identifying at least one of a location and an orientation of the target in the digital image is further based on the binary image.

18. The system of claim 14, further comprising:

receiving boundary information sufficient to form a bounding box around the target in the digital image, wherein generating the first array related to the digital image further comprises:

identifying a plurality of sampling windows in the digital image located outside the bounding box;

determining a pixel velocity value for a pixel located inside each of the plurality of sampling windows; and determining the plurality of binary values related to the pixel velocity of a first plurality of pixels in the digital image based, at least in part, on the determined pixel velocities for the pixels located inside the plurality of sampling windows.

19. The system of claim 14, further comprising:

determining a gradient value for a pixel in the first plurality of pixels;

determining a gradient threshold for the pixel in the first plurality of pixels; and determining the binary value in the first array for the pixel based, at least in part, on a comparison of the gradient value for the pixel with the gradient threshold for the pixel.

20. The system of claim 15, wherein the plurality of thresholds comprises a first threshold and a second threshold, wherein the first threshold is higher than the second threshold, and wherein identifying the plurality of target pixels and the plurality of background pixels in the digital image further comprises:

determining that a first pixel is marked as a target pixel in the first array;

identifying an entry in the second array corresponding to the first pixel;

determining that the entry in the second array is less than the first threshold, and in response identifying the first pixel as a target pixel;

determining that a second pixel is marked as a background pixel in the first array;

identifying an entry in the second array corresponding to the second pixel; and determining that the entry in the second array is greater than or equal to the second threshold, and in response identifying the second pixel as a background pixel.

* * * * *